United States Patent
Esenwein et al.

(10) Patent No.: US 8,487,503 B2
(45) Date of Patent: Jul. 16, 2013

(54) HAND POWER TOOL WITH BRUSH MOTOR

(75) Inventors: Florian Esenwein, Uhingen-Holzhausen (DE); Manfred Lutz, Filderstadt (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 12/737,909

(22) PCT Filed: Jul. 7, 2009

(86) PCT No.: PCT/EP2009/058543
§ 371 (c)(1),
(2), (4) Date: Feb. 28, 2011

(87) PCT Pub. No.: WO2010/023008
PCT Pub. Date: Mar. 4, 2010

(65) Prior Publication Data
US 2011/0175466 A1    Jul. 21, 2011

(30) Foreign Application Priority Data
Aug. 29, 2008    (DE) .......................... 10 2008 041 716

(51) Int. Cl.
*H02K 13/00*    (2006.01)

(52) U.S. Cl.
USPC ........................................................ 310/239

(58) Field of Classification Search
USPC .................................. 310/239, 50, 248, 242
See application file for complete search history.

(56) References Cited

U.S. PATENT DOCUMENTS

| 5,047,679 | A  | * | 9/1991  | Baader et al. ................... 310/89 |
| 5,696,418 | A  | * | 12/1997 | Corbach et al. ............... 310/239 |
| 6,087,754 | A  | * | 7/2000  | Berger .......................... 310/240 |
| 6,528,921 | B1 | * | 3/2003  | Nakane .......................... 310/239 |
| 2005/0225183 | A1 | | 10/2005 | Braun et al. |
| 2006/0276114 | A1 | | 12/2006 | Gallagher et al. |
| 2008/0090504 | A1 | | 4/2008  | Trautner et al. |
| 2008/0142351 | A1 | | 6/2008  | Gallagher et al. |
| 2008/0146126 | A1 | | 6/2008  | Gallagher et al. |
| 2008/0146127 | A1 | | 6/2008  | Gallagher et al. |

FOREIGN PATENT DOCUMENTS

| DE | 10248921 A1 | 5/2004 |
| EP | 1724057 A2  | 11/2006 |
| EP | 1911547 A1  | 4/2008 |

* cited by examiner

*Primary Examiner* — Nguyen N Hanh
(74) *Attorney, Agent, or Firm* — Maginot, Moore & Beck (57) ABSTRACT

A hand power tool with an oblong motor housing, particularly used as a handle, houses an electric collector motor. The brushes of the motor are housed in a brush holder with a brush shaft in a spring loaded way. Furthermore, the brush holder is solely/individually fixed in the motor housing, to which an axis intersection is associated, particularly a longitudinal, a vertical, and a transversal axis. According to the invention, the hand power tool is arranged in the motor housing in a space-saving manner with the shaft of the brush holder arranged opposite the vertical axis of the motor housing at an angle of approximately 20° in a laterally displaced way, particularly radially, relative to the longitudinal axis.

14 Claims, 7 Drawing Sheets

HAND POWER TOOL WITH BRUSH MOTOR

CROSS-REFERENCE TO RELATED APPLICATION

This application is a 35 USC 371 application of PCT/EP 2009/058543 filed on Jul. 7, 2009.

BACKGROUND OF THE INVENTION

1. Field of the Invention

The present invention is based on a hand-held power tool.

2. Description of the Prior Art

Modern hand-held power tools are usually driven by electric universal motors, i.e. collector or brush motors. In them, current for the commutation is transmitted from the power cable via brushes to the rotor collector, which rotates during operation. The brushes are spatially fixed in the housing by means of brush holders. The brush holder is composed of a rectangular shaft that guides the rectangular brush axially. It is equipped with a spring that presses the brush toward the collector. The brush wears down at its contact point due to sliding friction against the collector and, due to the action of the spring, moves axially toward the collector in accordance with its wear-induced loss in length. It is thus possible to maintain the flow of current between the collector and brush.

Known hand-held power tool motors are provided with two brushes and therefore also have two brush holders that can be situated individually in the housing or can be supported opposite each other on a support plate that can be affixed in the housing.

There are known brush holders with blade terminals with which it is possible for example to electrically contact the brush cable, an electronic unit, the field coils, etc.

Relative to the motor axis, the spring is situated behind or next to the brush. Most often, a spiral/clock spring is used for this. In other designs, a compression spring is placed axially over the brush. This increases the overall length of the brush and the size of the motor housing due to the radial overlapping of the cover of the brush holder system. The resulting losses in convenience and safety must be taken into account when the motor housing is used as a handle.

ADVANTAGES AND SUMMARY OF THE INVENTION

The advantage of the invention is that when the new brush holder is used, the space in the motor housing can be used more efficiently and therefore the hand-held power tool can be built smaller, e.g. with a reduced handle diameter and reduced length.

In addition, a service opening of the motor housing at the base of the new brush holder and the cover of the latter can be relatively small and in addition, a screw boss can be provided for screw-mounting the cover. The smaller the service opening, the more stable/rigid the motor housing or cover provided therewith.

The fact that the brush holder according to the invention is a separate brush holder that can be individually mounted in the device independently of other brush holders and for example does not sit on a shared support plate with other brush holders simplifies installation and brush replacement.

When the cover is open, the brush holder is freely accessible so that without disassembling other components of the device, the spring arm is lifted up, the worn brush is removed, and a new brush can be inserted. It is thus simple and convenient to perform a brush replacement and even a brush holder replacement.

When a service opening is provided, the central screw boss required for the cover limits the space available for the brush holder. With a conventional design of the brush holder, this screw boss would have been in the way of a spring extending axially toward the rear and thus would not have been possible to implement. According to the invention, the spring has therefore been positioned on the brush holder so that it is situated next to the screw boss. The central position of the screw boss on the housing here serves to optimally introduce the force of the cover screw into the cover, thus giving the hand-held power tool a symmetrical design and thus an intuitively safer operation.

In order to be able to position the spring next to the screw boss, the shaft of the brush holder has been offset or rotated out of its central position according to the prior art by an angle $\alpha$ around the longitudinal axis to make it possible to achieve an optimal introduction of the spring force onto the brush over the entire service life of the brush. The above-described angular offset of the shaft around the longitudinal axis makes it possible to position the spring next to the screw boss.

The off-center positioning of the shaft also extends the plug contacts of the brush holder upward, close to the housing circumference, toward the middle, and axially farther forward in the motor housing. As a result, the space in the device is more effectively used and the housing is shorter and lighter in weight. In addition, the electrical connecting lines can be shortened and are easier to install. With the embodiment of the device according to the invention, in the motor housing next to the brush holder, there are two openings through which, during installation of the field winding, the field lines are guided into the rear region of the motor housing.

If the shaft of the brush holder were not offset laterally and angularly out of the central position in order to thus have the plug contacts closer to the center line on top of the motor housing, then the motor housing would have to be modified in the region of the brush holder for the placement of a service opening and cover, entailing a significant additional cost in terms of design and manufacture in order to attain the desired stability, strength, and vibration behavior of the motor housing and therefore of the entire device.

Figure 7:
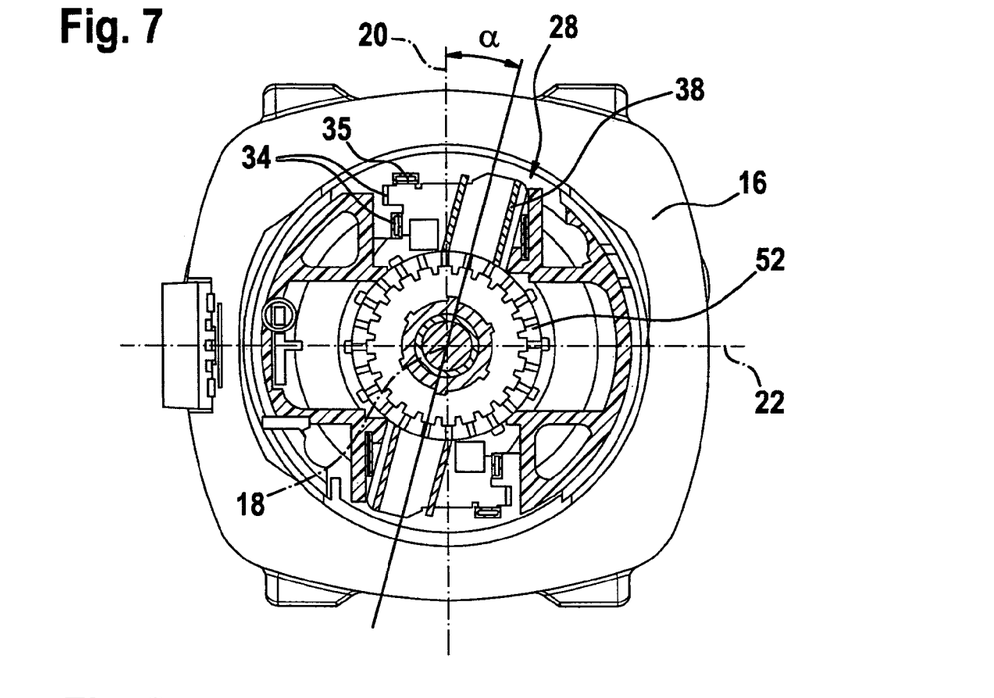
FIG. 7 is a cross-section through the motor housing, showing the collector and brush holder according to FIG. 2.

In another variant of the brush holder, in addition to the placement of the shaft at an angle, the spring, in particular its spiral roll, can be positioned at an angle to the shaft, see FIG. 7. The placement of the spring at an angle permits it to be more easily guided past the screw boss during installation of the brush holder.

The improved utilization of space is achieved both with and without the service opening. Due to the angled placement of the shaft, if the plug contacts are still positioned centrally, then the width of the brush holder as a whole is reduced. As a result, the plug contact of the brush cable is spaced a sufficient distance, preferably 8 mm, apart from the shaft to prevent the brush cable from becoming a safety hazard, even with aging and the accumulation of electrically conductive dust, see FIG. 8.

The angled positioning of the brush and the shaft of the brush holder does not influence the manufacture and assembly of the hand-held power tool since only the brush holder has been modified. The modification is comprised solely of the fact that the shaft is attached to the support plate of the brush holder, in particular by means of a crimped connection, at an oblique angle instead of in the previous orientation at right angles. The spring recess of the brush holder here must be oriented so that the spring arm rests in the middle of the shaft and contacts the brush centrally, acting on it in the axial direction and providing it with an optimal mechanical and electrical support against the collector. This assures a more reliable electrical contact at a low level of friction between the brush and collector.

During assembly of the hand-held power tool or during repairs, the brush holder can be easily inserted into the device from above through the service opening and screwed in place or fixed in another way, e.g. by means of detent lugs. It is thus automatically situated at an angle α without requiring adjustment.

Because the invention only modifies the motor housing in a way that allows the motor housing, during its manufacture, to be removed from the mold in an unchanged fashion at a 90° angle, the new motor housing can be manufactured without an increase in cost.

BRIEF DESCRIPTION OF THE DRAWINGS

The invention will be explained in detail below in conjunction with an exemplary embodiment and accompanying drawings, in which.

DESCRIPTION OF THE PREFERRED EMBODIMENT

Figure 1:
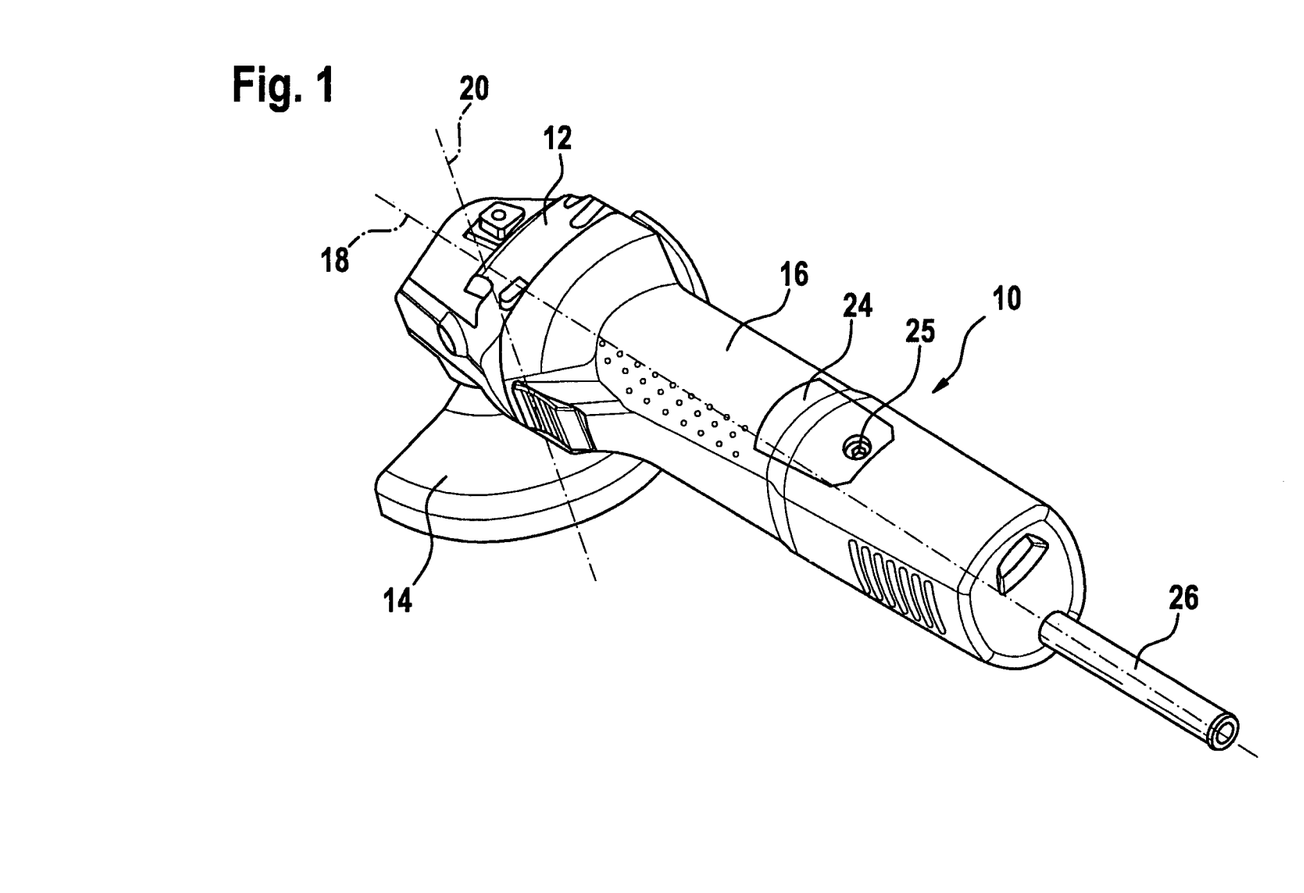
FIG. 1 shows an angle grinder according to the invention, with a service opening and cover.

A hand-held power tool depicted three-dimensionally in FIG. 1 is embodied in the form of an angle grinder 10 and at the front, to the left in the drawing, has a transmission housing 12 composed of metal. Extending downward from it parallel to the vertical axis 20 of the angle grinder 10, it has an output shaft, not shown, for accommodating a grinding disk, not shown, that is encompassed by a safety guard 14. At the rear, a cup-shaped motor housing 16 that defines a longitudinal axis 18 of the angle grinder 10 is flange-mounted to the transmission housing 12. This motor housing accommodates a universal motor that is customarily used in hand-held power tools, i.e. an electric motor 50 (FIG. 7) with a collector 52. A cable 26 for supplying current to the motor 50 extends out from the rear of the motor housing 16.

In the middle of its top surface, the motor housing 16 is provided with a cover 24 of a service opening 23 (FIG. 2), which is screw-mounted flush with the motor housing 16 by means of a cover screw 25. Diametrically opposite from the cover 24, on the unseen underside of the motor housing 16, an identical cover 24 is provided for closing the lower service opening 23 for the second brush holder so that the supply of current to the motor 50 is provided in the conventional way by means of two brushes offset from each other by 180°.

Figure 2:
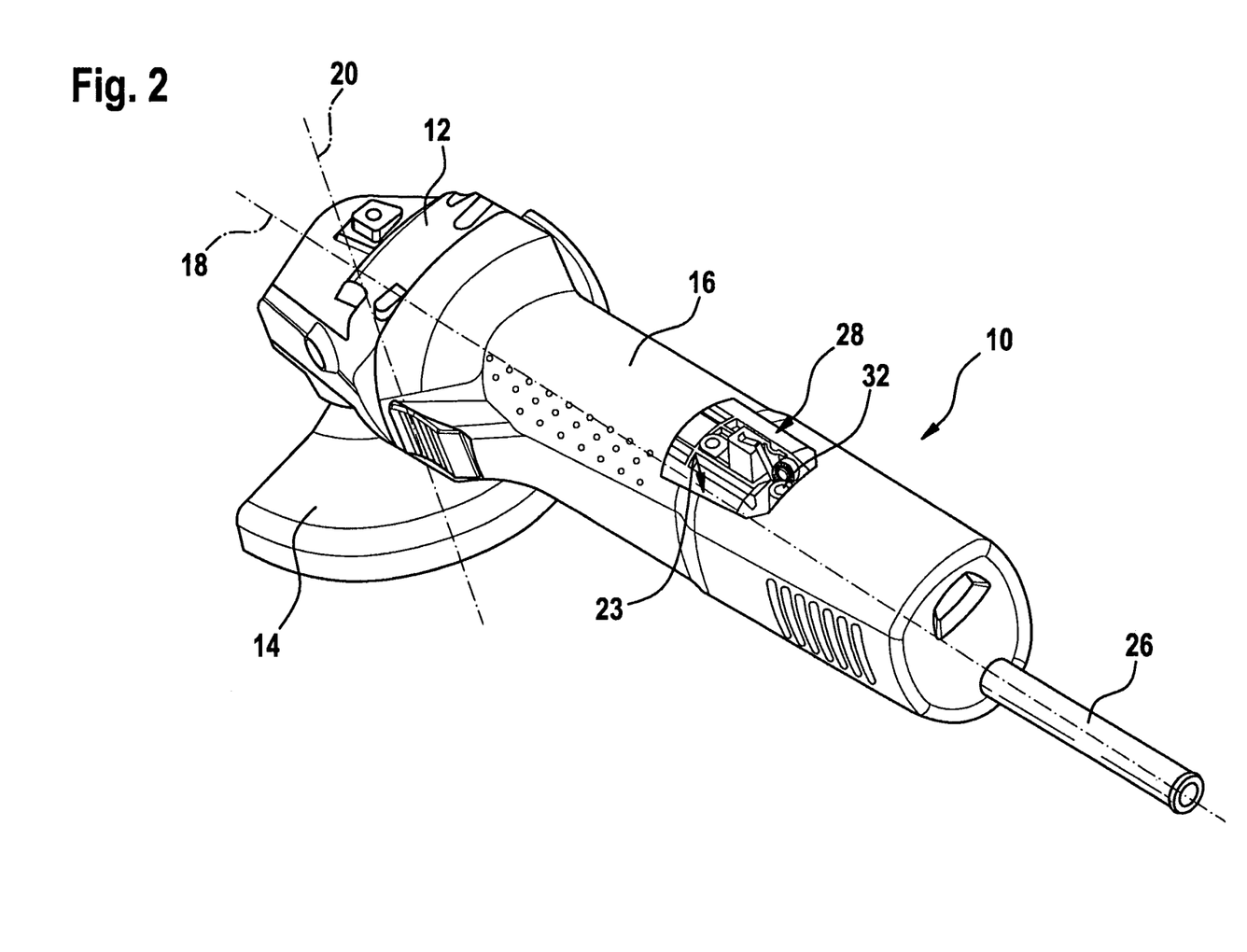
FIG. 2 shows the angle grinder from FIG. 1, with an open service opening.

FIG. 2 shows the angle grinder 10 without the cover 24 or with an open cover, in a view from above showing the service opening 23; this view shows the details according to FIG. 1 as well as a brush holder 28 and a screw boss 32. Components identical to them are provided on the underside of the motor housing 16 and will be shown in greater detail in the figures that follow.

Figure 3:
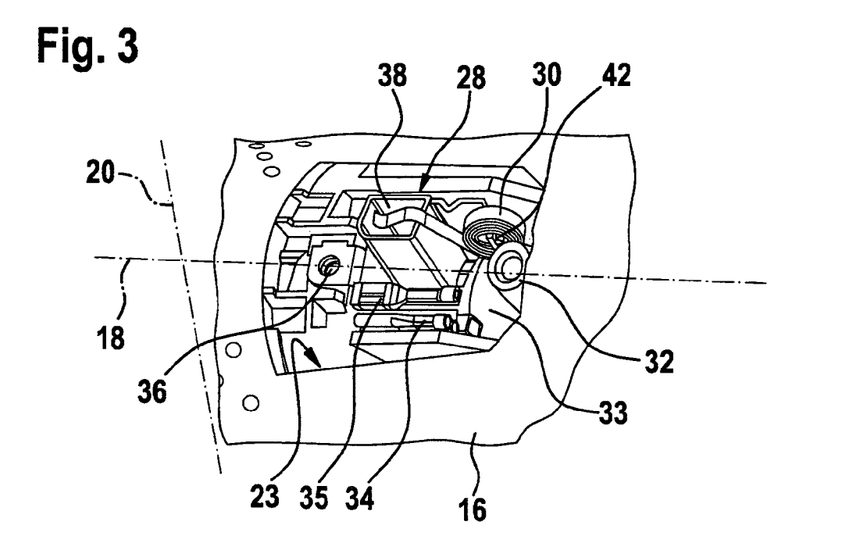
FIG. 3 is an enlarged side view of the open service opening from FIG. 2.

FIG. 3 is an enlarged side view of the motor housing 16, with the open service opening 23 from FIG. 2, showing the brush holder 28 with a spring 30 situated behind it, which is supported on a spring axle 42 constituted by a shaped component of a support plate 40, see FIG. 9. With a spring arm 31 pointing forward parallel to the longitudinal axis 18, the spring 30 reaches from above centrally into a shaft 38 that serves as a longitudinal guide for a brush or carbon insert 39, shown in FIG. 6. An eyelet 36 of the brush holder 28, which eyelet is bent out from the support plate 40, is fixed to the motor housing 16 by means of a screw, not shown, or by means of a detent lug. A screw boss 32 protruding from a rib 33 of the motor housing 16 perpendicularly and parallel to the vertical axis 20 is provided for engagement by the cover screw 25 for fastening the cover 24 to the motor housing 16 in a flush, sealed fashion (FIG. 1). The spring 30 here is situated spaced laterally apart from the screw boss 32. In addition, blade terminals 34 with attached cable clamps 35 for a brush cable 46 (FIG. 6) are also visible.

Figure 4:
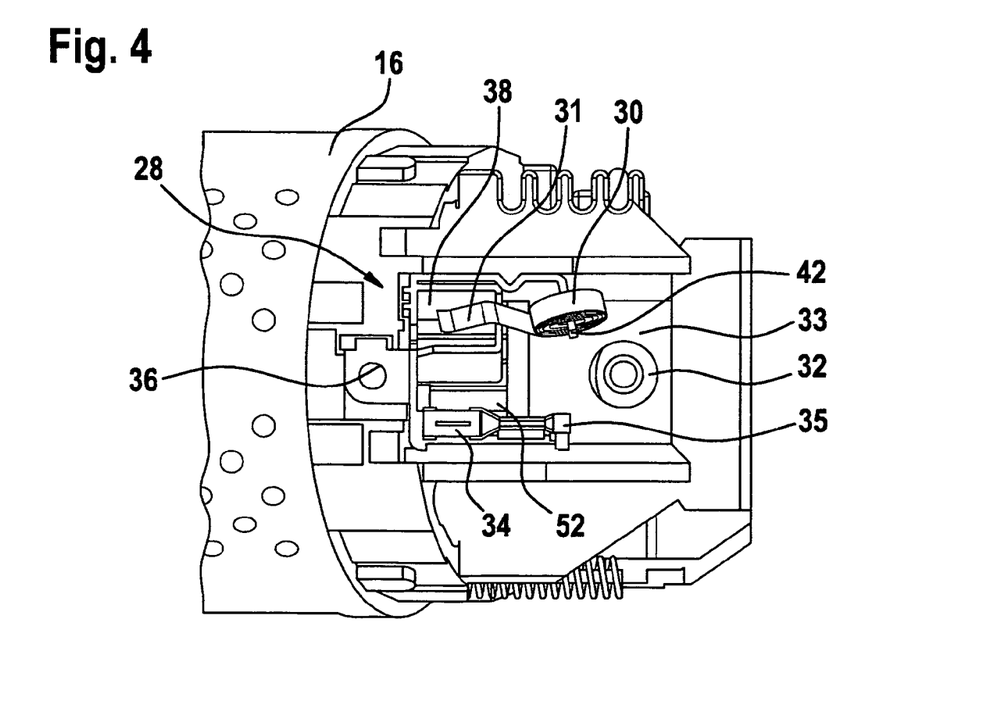
FIG. 4 is a top view of a variant of the brush holder, with an open housing.

FIG. 4 is an enlarged top view of the open motor housing 16, with a variant of the brush holder 28 according to the invention, showing its central attachment in the motor housing 16 by means of the eyelet 36 and the off-center positioning of the shaft 38 of the brush holder 28 with the angled spring 30 supported on the spring axle 42, and the spring arm 31 without a brush, with the collector 52 visible underneath, as well as the screw boss 32. The drawing also shows a blade terminal 34 with a cable clamp 35 of a brush cable, not shown, as a component of the brush holder 28.

Figure 5:
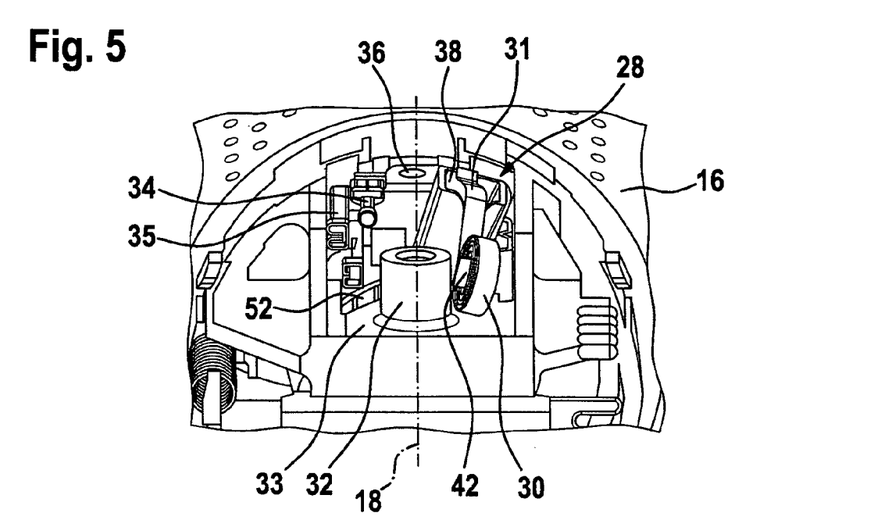
FIG. 5 is a rear view of FIG. 4.

FIG. 5 is an enlarged rear view of FIG. 3, with a view of the open motor housing 16 including the transversely oriented rib 33 that supports the screw boss 32 for attachment of the cover 24 (FIG. 1). The drawing also shows the positioning of the brush holder 28, i.e. its central attachment in the motor housing 16 by means of the eyelet 36 and the off-center shaft 38 of the brush holder 28 oriented in a vertical projection relative to the longitudinal axis 18, with the spring 30 supported on the spring axle 42 and the spring arm 31 without a brush, with the collector 52 visible underneath. The drawing also shows two blade terminals 34, each equipped with a cable clamp 35 of a brush cable, not shown, as a component of the brush holder 28.

Figure 6:
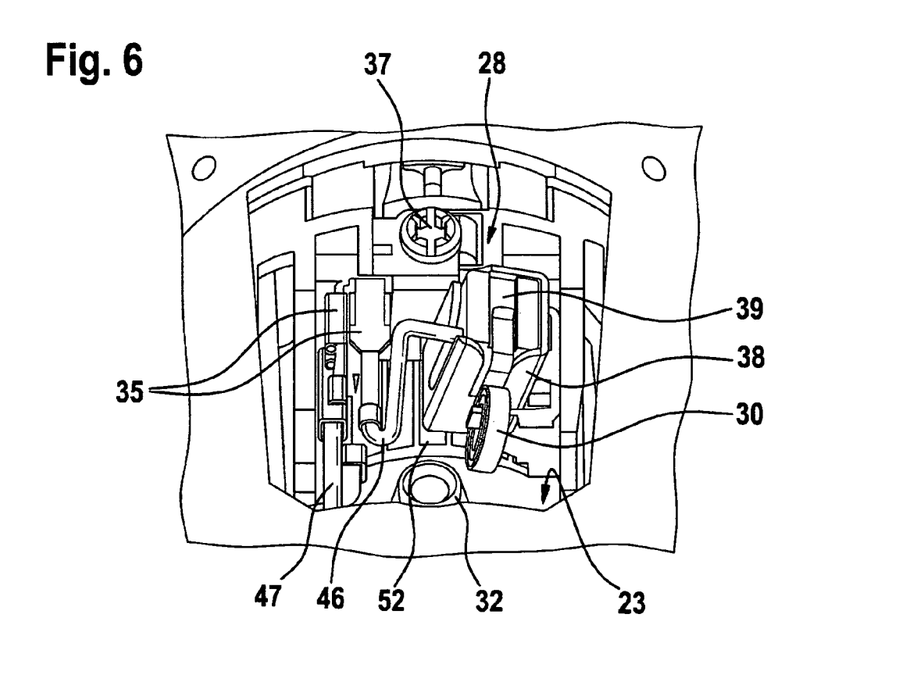
FIG. 6 is a view similar to FIG. 3 but from the rear, with a multiply bent brush cable.

FIG. 6 is an enlarged view similar to FIG. 3, but by contrast with FIG. 5, shows the service opening 23 with a multiply bent brush cable 46 connected to the brush holder 28, a straight brush cable 47 with cable clamps 35, a brush or carbon insert 39 placed in the shaft 38, and a screw 37 for attaching the brush holder 28 to the motor housing 16.

FIG. 7 is a cross-section through the motor housing 16 of FIG. 2, with the collector 52 and brush holders 28, clearly depicting the positioning of the shaft 38 of the brush holder 28 angularly offset from the vertical axis 20 radial to the longitudinal axis 18, the transverse axis 22 of the brush holder, the blade terminals 34, and the screw 37 (FIG. 6).

Figure 8:
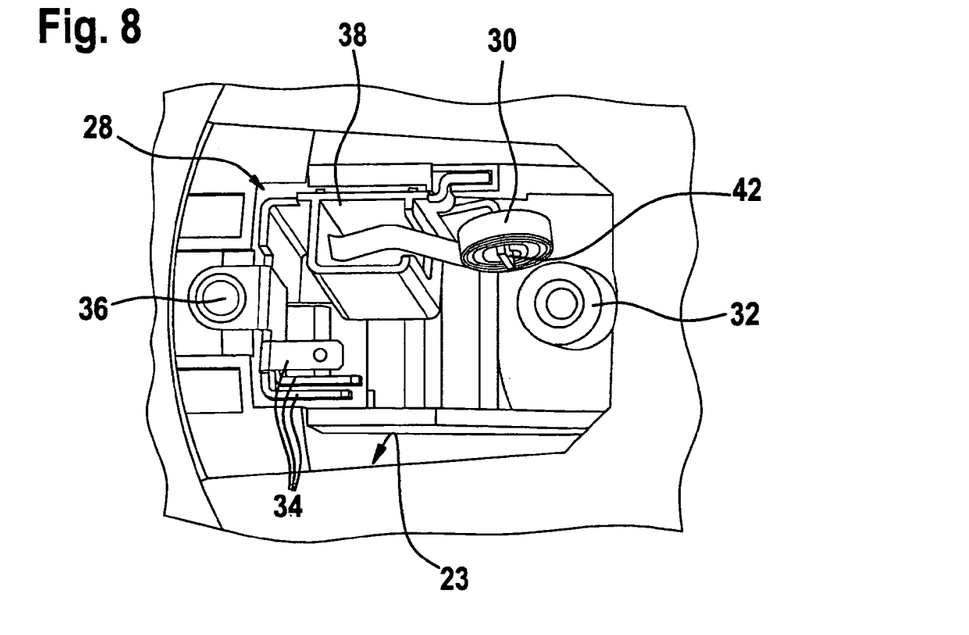
FIG. 8 is a variant in a side view of the open service opening from FIG. 2.
Figure 9A:
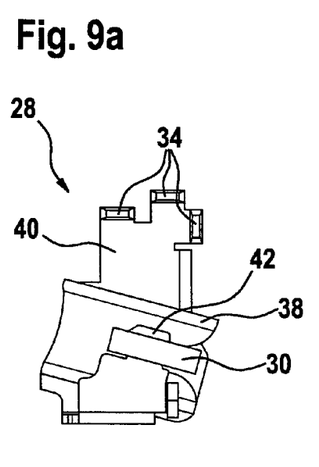
FIGS. 9a-f show the brush holder as a unit in its six 90° side projections and in a perspective view.
Figure 9B:
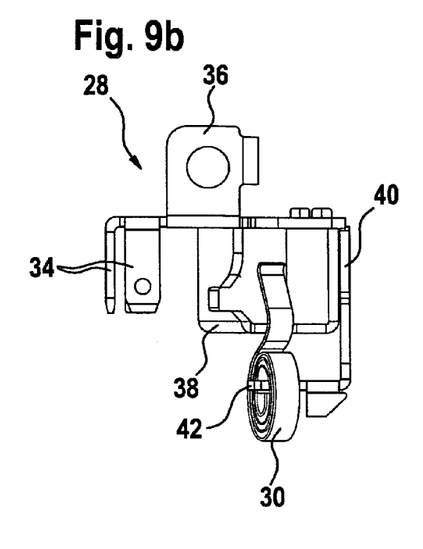
Figure 9C:
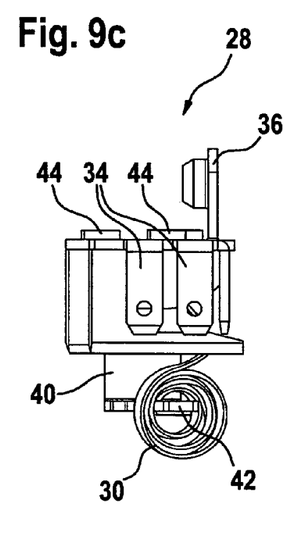
Figure 9D:
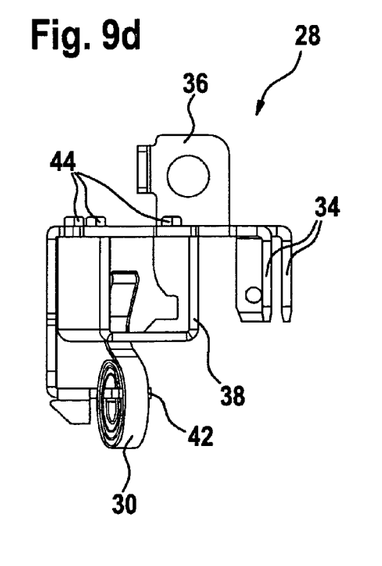
Figure 9E:
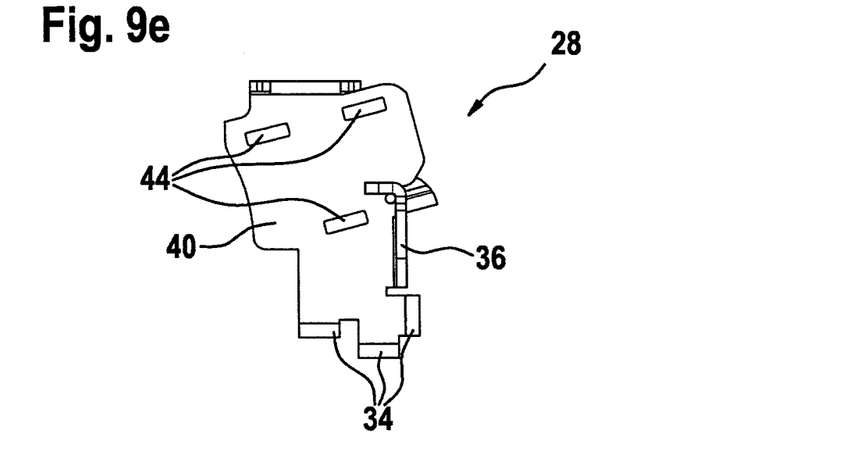
Figure 9F:
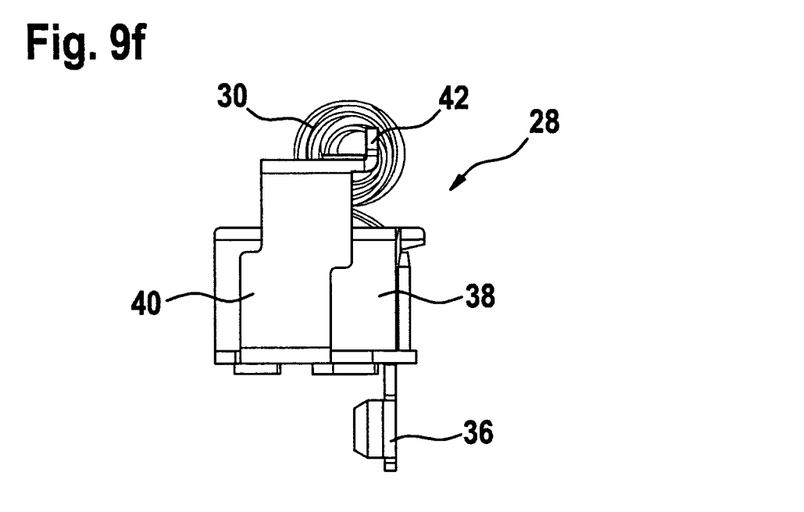

FIG. 8 shows a variant in a side view of the open service opening 23 according to FIG. 2, from another viewing angle, once again illustrating that the brush holder 28 is constructed of sheet metal and showing the above-mentioned details without requiring a repeat explanation thereof.

The brush holder 28 with a spring 30, shown in detail in six 90° side projections and one perspective view in FIGS. 9a-f, is constructed of sheet metal; a support plate 40 is multiply bent and punched and is crimp-connected to the sheet metal of the shaft 38, which is bent into a U-shape.

Bent end regions of the support plate 40 here integrally compose the spring axle 42, the blade terminals 34, and the eyelet 36.

The brush holder 28 can also be composed of plastic with inlaid electrical conducting paths.

In lieu of the hand-held power tool described as an angle grinder, it is also possible for a hand-held drill, scraping tool, random orbital sander, jigsaw, etc. with a motor housing embodied in the form of a handle to be equipped with the brush holder according to the invention, with or without the service opening and cover.

The foregoing relates to the preferred exemplary embodiment of the invention, it being understood that other variants and embodiments thereof are possible within the spirit and scope of the invention, the latter being defined by the appended claims.

The invention claimed is:

1. A hand-held power tool comprising:
   an elongated motor housing, which defines a longitudinal axis, a vertical axis that is orthogonal to the longitudinal axis, and a transverse axis that is orthogonal to both the longitudinal and vertical axes;
   an electric collector motor, which is mounted in the elongated motor housing and which includes at least one brush; and
   a first brush holder configured to support the at least one brush of the electric collector motor in spring loaded fashion, the first brush holder being affixed in the electric motor housing independent of the electric collector motor and having a first brush shaft that extends radially relative to the longitudinal axis and that is angularly offset from the vertical axis of the motor housing by an angle of approximately 20° with respect to the longitudinal axis.

2. The hand-held power tool as recited in claim 1, further comprising:
   a second brush holder configured to support at least one additional brush of the electric collector motor in spring loaded fashion, the second brush holder being affixed in the electric motor housing independent of the electric collector motor and having a second brush shaft that is offset from the vertical axis of the motor housing by an angle of approximately 20° about the longitudinal axis,
   wherein the first and second brush holders are situated diametrically opposite each other on the motor housing.

3. The hand-held power tool as recited in claim 2, wherein the brush holder is composed of a multiply bent sheet metal support plate to which the shaft, embodied as a piece of sheet metal bent into a U-shape, is fastened via a crimped connection.

4. The hand-held power tool as recited in claim 1, wherein the brush holder is composed of a multiply bent sheet metal support plate to which the shaft, embodied as a piece of sheet metal bent into a U-shape, is fastened via a crimped connection.

5. A hand-held power tool with an elongated motor housing, in particular serving as a handle, which accommodates an electric collector motor in which brushes of the motor are supported in spring-loaded fashion in a brush holder provided with a brush shaft, which brush holder is separately/individually affixed in the motor housing which is associated with a longitudinal axis, a vertical axis, and a transverse axis, the shaft of the brush holder being situated laterally offset relative to the vertical axis of the motor housing by an angle of approximately 20°, in particular radially relative to the longitudinal axis, wherein a spiral spring, which is supported on the brush holder and is equipped with a spring arm, serves to spring-load the brush while a central plane constituted by the spiral spring extends essentially parallel to the longitudinal axis.

6. The hand-held power tool as recited in claim 5, wherein the central plane constituted by the spiral spring is laterally inclined relative to the shaft and the spiral spring is situated next to a screw boss.

7. The hand-held power tool as recited in claim 6, wherein the brush holder is provided with at least one blade terminal for connecting a brush cable and each blade terminal has a minimum electrical safety distance from a service opening of the motor housing, an eyelet of the brush holder, and the screw boss.

8. The hand-held power tool as recited in claim 6, wherein the brush holder has a first, a second, and a third blade terminal, each of which is bent out from a shared flat support plate, the first and second blade terminals extending in a vertical plane and the third blade terminal extending in a horizontal plane.

9. The hand-held power tool as recited in claim 6, wherein the brush holder has an eyelet that is bent out from a support plate and which is for affixing the brush holder to the motor housing.

10. The hand-held power tool as recited in claim 9, wherein the brush holder is composed of a multiply bent sheet metal support plate to which the shaft, embodied as a piece of sheet metal bent into a U-shape, is fastened via a crimped connection.

11. The hand-held power tool as recited in claim 6, wherein the screw boss for affixing a cover, which closes a service opening to the top side of the motor housing is centrally situated on a rib and is spaced a minimum electrical safety distance apart from current-conducting parts of the brush holder.

12. The hand-held power tool as recited in claim 11, wherein the brush holder is composed of a multiply bent sheet metal support plate to which the shaft, embodied as a piece of sheet metal bent into a U-shape, is fastened via a crimped connection.

13. The hand-held power tool as recited in claim 6, wherein the brush holder is composed of a multiply bent sheet metal support plate to which the shaft, embodied as a piece of sheet metal bent into a U-shape, is fastened via a crimped connection.

14. The hand-held power tool as recited in claim 5, wherein the brush holder is composed of a multiply bent sheet metal support plate to which the shaft, embodied as a piece of sheet metal bent into a U-shape, is fastened via a crimped connection.

* * * * *